US006068438A

United States Patent [19]

Barry

[11] Patent Number: 6,068,438

[45] Date of Patent: May 30, 2000

[54] CARGO-CONTAINER CRANE AND SYSTEM

[76] Inventor: Leonard D. Barry, 19300 Pennington, Detroit, Mich. 48221

[21] Appl. No.: 08/904,564

[22] Filed: Aug. 4, 1997

Related U.S. Application Data

[60] Provisional application No. 60/022,422, Aug. 5, 1996, and provisional application No. 60/044,935, Apr. 25, 1997.

[51] Int. Cl.[7] .......... B65G 67/02

[52] U.S. Cl. .......... 414/392; 414/344; 414/399; 414/744.3

[58] Field of Search .......... 414/344, 391, 414/392, 399, 917, 744.2, 744.3; 901/21

[56] References Cited

U.S. PATENT DOCUMENTS

| | | | |
|---|---|---|---|
| 521,256 | 6/1894 | Browne | 414/917 |
| 2,540,612 | 2/1951 | Fischer et al. | 414/744.3 X |
| 3,010,587 | 11/1961 | Hollinger | 901/21 X |
| 4,139,107 | 2/1979 | Ninomiya et al. | 414/392 |
| 4,175,899 | 11/1979 | Tipton | 414/917 |
| 4,362,456 | 12/1982 | Barry | 414/334 |
| 4,370,086 | 1/1983 | Barry | 414/337 |
| 4,483,652 | 11/1984 | Barry | 414/392 |
| 4,548,544 | 10/1985 | Van Appledorn | 414/751 |
| 4,620,831 | 11/1986 | Poncet et al. | 414/744.3 |
| 4,728,252 | 3/1988 | Lada et al. | 901/21 X |
| 4,746,257 | 5/1988 | Barry | 414/392 |
| 4,946,328 | 8/1990 | Barry | 414/392 X |
| 4,981,410 | 1/1991 | Barry | 414/392 |
| 5,017,083 | 5/1991 | Sahlin | 414/744.3 |
| 5,085,556 | 2/1992 | Ohtomi | 414/744.3 |
| 5,219,261 | 6/1993 | Barry | 414/392 |
| 5,271,292 | 12/1993 | Sawada et al. | 901/21 X |
| 5,421,688 | 6/1995 | Füchtey et al. | 414/392 |
| 5,429,469 | 7/1995 | Zimek | 414/277 |

FOREIGN PATENT DOCUMENTS

| | | | |
|---|---|---|---|
| 800032 | 8/1950 | Germany | 414/392 |
| 2555676 | 6/1977 | Germany | 212/251 |
| 3542190 | 6/1987 | Germany | 414/344 |
| 1-240289 | 9/1989 | Japan | 414/744.3 |
| 1-257589 | 10/1989 | Japan | 414/917 |
| 2-69981 | 3/1990 | Japan | 414/917 |
| 1253942 | 2/1996 | U.S.S.R. | 414/917 |

*Primary Examiner*—David A. Bucci

*Attorney, Agent, or Firm*—Gifford, Krass, Groh, Sprinkle, Anderson & Citowski, P.C.

[57] ABSTRACT

This is a top lift rotary-crane transfer device and system especially suited for transferring cargo containers between a railway car and one or more conveyors or other vehicles or storage spots. It has a revolving loadspreader on the end of a revolving crane connected by chain and sprockets or gearing to cancel to hold the loadspreader in parallel positions while translating around a supporting column. Improved alignment columns on the loadspreader are carried above the ground and swing up to clear over containers set on a conveyor. The alignment columns align the loadspreader transversely over a container, well car, flat-bed trailer, or along a conveyor. The alignment of the loadspreader can be turned if desired to engage one end first and help clear an adjacent car. The loadspreader can be suspended on swinging links and be swung back from a vehicle to increase clearance over adjacent vehicles or loads; or the loader can have its positioning arm retractable to increase this clearance and extensible to position the loadspreader over a vehicle.

12 Claims, 12 Drawing Sheets

CARGO-CONTAINER CRANE AND SYSTEM

This application claims Priority of Provisional Applications Ser. No. 60/022,422, dated Aug. 05, 1996 and Ser. No. 60/044,935, dated Apr. 25, 1997.

CROSS REFERENCE TO RELATED PATENTS

This invention further relates to my pending U.S. patent application Ser. No. 08/436,722, now U.S. Pat. No. 5,733,092 and to my U.S. Pat. No. 5,219,261 issued Jun. 15, 1993 and to lesser extent to other of my patents on rotary loaders.

BACKGROUND OF THE INVENTION

This is a top lift rotary transfer device and system for transferring such things as cargo containers between rail cars and semitrailers, conveyors,, or storage spots. This invention includes improvements to the space requirements and clearances and to the loadspreader alignment particularly to interface with conveyors and in part generally applicable to my pending patent application Ser. No. 08/436,722.

BRIEF SUMMARY OF THE INVENTION

It is an object to provide a top lifting rotary device for transfer of cargo containers parallelly In rapid succession between railway cars on a track and side-by-side on a conveyor run at 90 degrees to the track, rather than the bottom lift devices of my U.S. Pat. Nos. 4,124,129; 4,519,737; 4,746,257; 4,946,328; and 4,981,410; etc. and so that existing rail cars can be used with this device.

It is an object to hold the loadspreader parallel and retractable radially as it is moved around a pivot post.

It is an object to modify and simplify the alignment columns and operation of my pending U.S. patent application Ser. No. 08/436,722 to accomodate transfer between railway cars and conveyors and semitrailers.

It is an object to provide alignment columns that can be kept above the ground when the crane is moved around.

These other and further objects and features should become evident to those skilled in the art by study of this specification with reference to the drawings wherein:

DETAILED DESCRIPTION OF THE PREFERRED EMBODIMENTS

Figure 1:
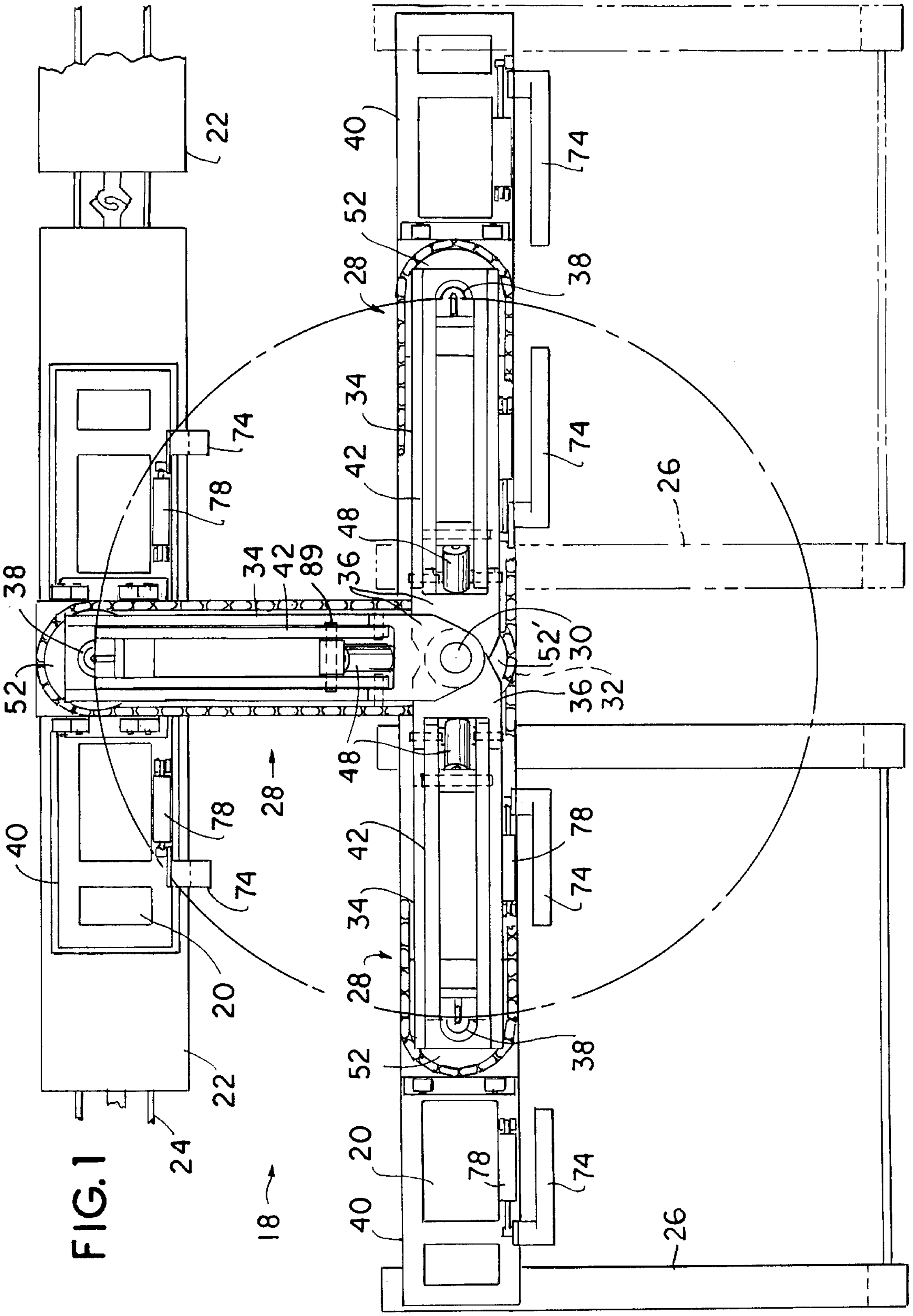
FIG. 1 is a plan view of a transfer loader having three cranes which rotate about a pivot column transferring cargo containers from rail cars to one or two conveyors or vice-versa.
Figures 2, 3, 4, 5:
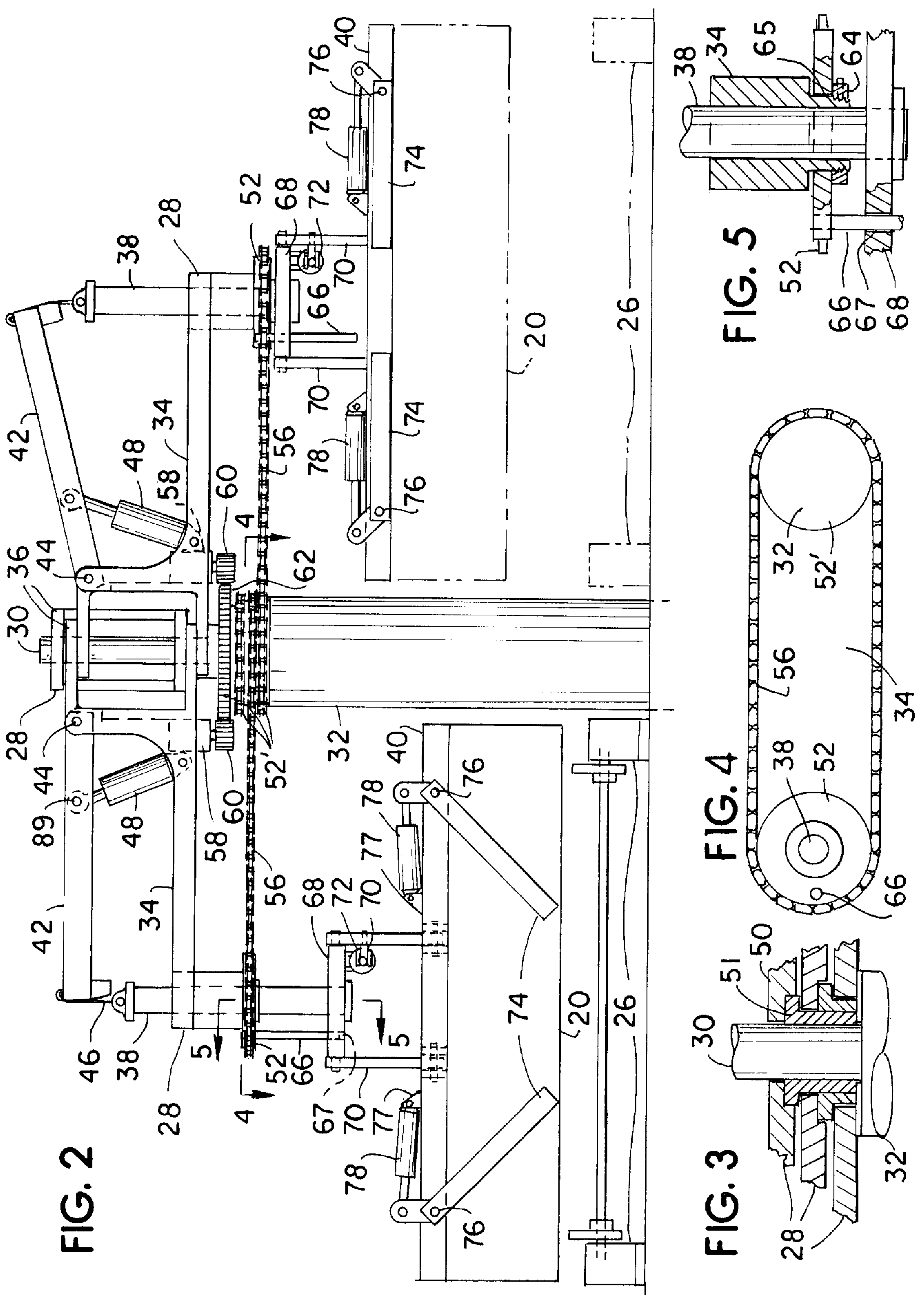
FIG. 2 is a front elevation of the loader shown in FIG. 1 with one of the cranes transferring a cargo container to the conveyor on the left.
FIG. 3 is a vertical section of the preferred mount of the cranes about the base of the pivot post.
FIG. 4 is a schematic section on line 4—4 of FIG. 2.
FIG. 5 is a partial section on line 5—5 of FIG. 2.

Referring to the drawings and in particular to FIGS. 1 and 2 where a rotary loader 18 is positioned to transfer cargo containers 20 between vehicles or railway cars 22 on a driveway and/or track 24 and one or more conveyors 26. The cars can be moved by a car mover or locomotive to the approximate position shown.

The loader has one or more cranes 28 mounted on a pivot post 30 on top of a vertical column 32. Three jib cranes are shown in FIGS. 1 and 2 each having a radial guide arm 34 integral with offset bracket 36 to stack on pivot post 30, a vertical lift shaft 38 mounted to slide or roll up and down on the outer end of the jib crane guide arm, a load spreader 40 supported horizontally from the bottom of the lift shaft, a lift arm 42 pivotally mounted on pin 44 to the guide arm and extending out radially over and connected by cable or links 46 to the top of the lift shaft, and a hydraulic cylinder 48 connected between the lift arm and the guide arm to lift and lower loadspreader 40.

Referring to FIG. 3, the weight of each of the three cranes on pivot 30 can be stacked but is preferably separately carried directly on column 32 by flanged bushings 50 and 51 carrying the weight of the middle and upper cranes respectively.

Referring to FIGS. 1, 2, end 4, each crane has a large sprocket 52 mounted to rotate on the bottom of arm 34 concentric with shaft 38 therethrough and a sprocket 52' of the same number of teeth and pitch as sprocket 52 secured in line concentric on column 32. A chain 56 is connected around the sprockets for each crane to rotate sprocket 52 once each revolution of the guide arm about the pivot post. Arm 34 is revolved about column 32 by gearmotor 58 secured to the guide arm and driving spur gear 60 engaging a gear rack ring 62 secured concentric with pivot post 30 about the top of column 32. Referring to FIG. 5, sprocket 52 is supported by collar 64 screwed on the bottom of a depending neck 65 about which the sprocket rotates on arm 34 and in which neck the lift shaft slides up and down.

As the crane is rotated about the pivot post the loadspreader is held in parallel positions to translate by a connection with sprocket 52. Referring to FIGS. 2, 4, and 5, for a short lift crane this connection can be rod 66 secured depending from sprocket 52 down to slip through a hole 67 in a platform frame 68 suspending the loadspreader on two swinging parallel links 70 at each end mounted to swing the loadspreader transversely level. Links 70 have ball joints 71 top and bottom, FIG. 9. A double acting cylinder 72 is connected between the links and either frame 68 or the loadspreader to retract the loadspreader back to clear over adjacent vehicles etc.

Figures 13, 14, 15, 16, 17, 18:
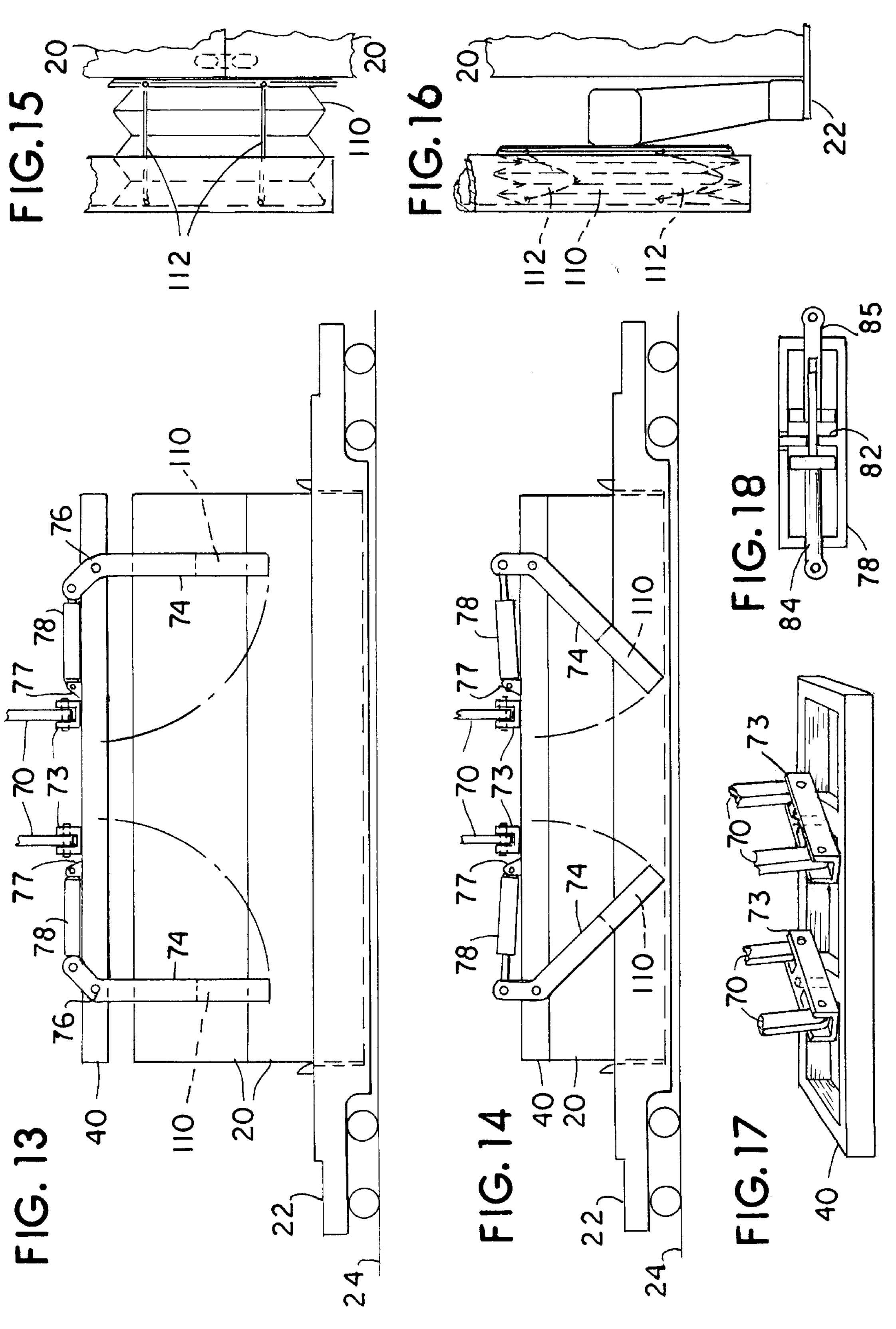
FIGS. 13 and 14 are side elevations of a well car with a loadspreader of a crane engaging respectively the top and bottom container on the car.
FIGS. 15 and 16 are partial sectional side elevations of an alignment column engaging respectively two containers and a well car.
FIG. 17 is a perspective view of the loadspreader with optional swivel supports.
FIG. 18 is a sectional view of a double air cylinder for lifting an alignment column 45° or 90° up.
Figure 19:
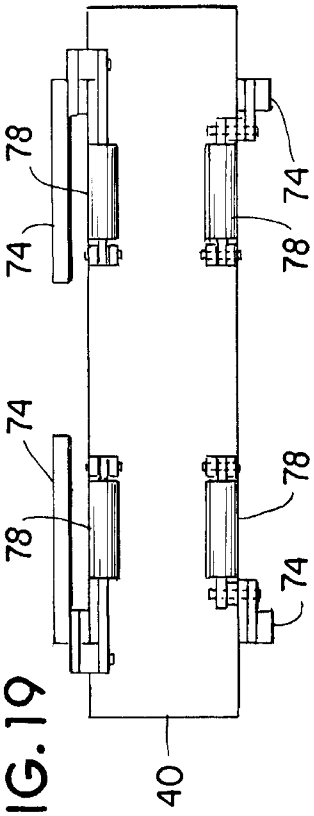
FIGS. 19 and 20 are plan and side elevations of a loadspreader engaging a container on a semitrailer.
Figure 20:
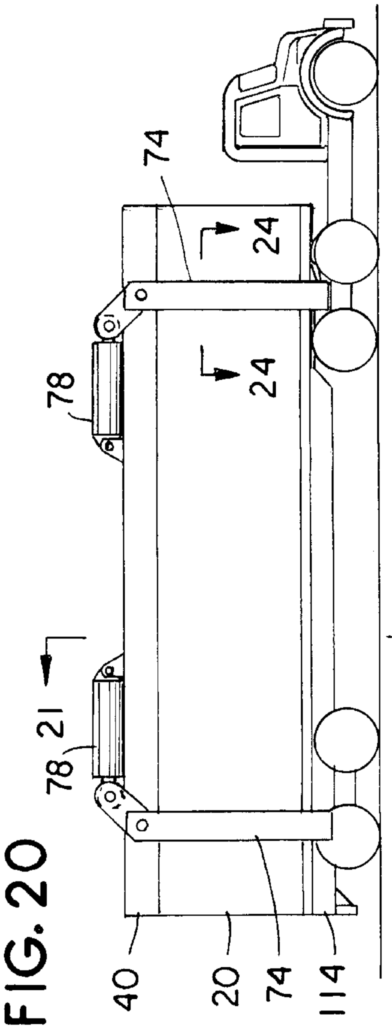

Rod 66 slips in hole 67 in frame 68 as the crane lifts and lowers the loadspreader. As the crane is rotated about pivot 30 the loadspreader it carries is translated by rod 66 without turning except as links 70 permit limited turning or modification made for sidecoupling a vehicle. Referring to FIG. 17, optionally the bottom of the two links 70 for each end of the loadspreader can be connected to a transverse swivel bar 73 pivotally connected at center to the top of the loadspreader to increase the turning of the loadspreader to align a vehicle within more arc of turning of the crane.

PARALLEL SIDE ALIGNMENT

Each loadspreader 40, in addition to having the usual alignment guides and twist locks for locking in the corner castings on the top of the containers, has alignment columns 74 mounted to swing up along the near side of the loadspreader to clear over containers on conveyor 26. The alignment columns 74 are each pivotally secured on a pin 76 extending at right angles from the near side of the loadspreader. Each column 74 is lifted by an air cylinder 78 pivotally connected between a bracket 77 on top of the loadspreader and a lever arm integral on top of the column 74.

Figure 12:
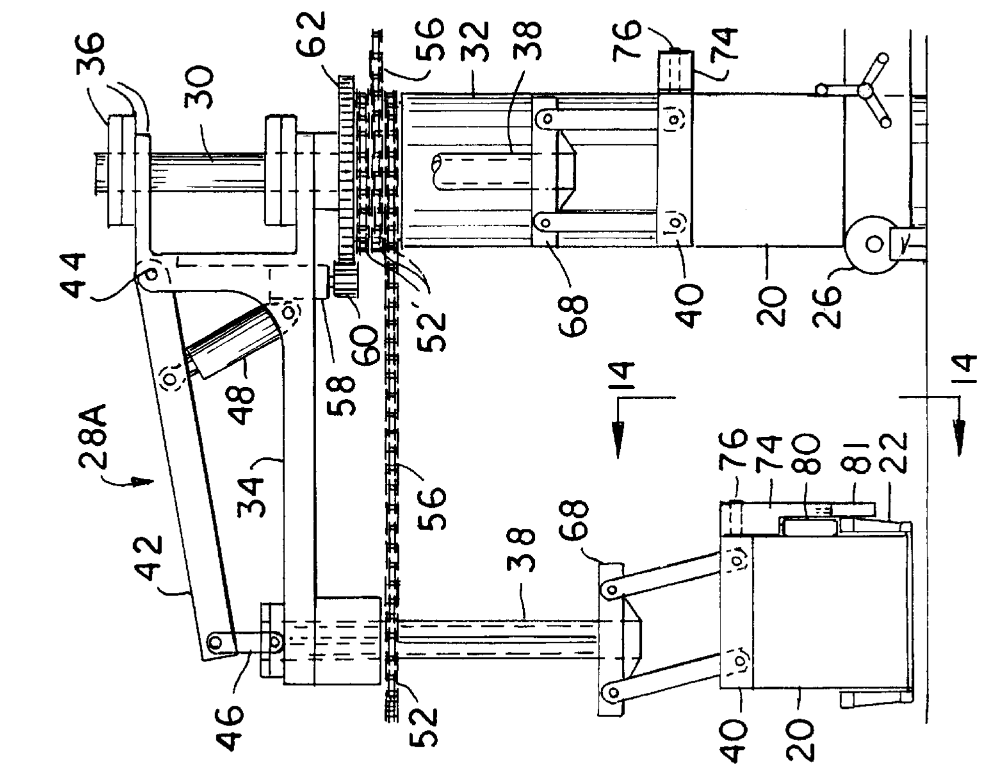
FIGS. 11 and 12 are side elevations of a loader showing a crane transferring respectively a top and bottom container between a well car and a conveyor.
Figure 11:
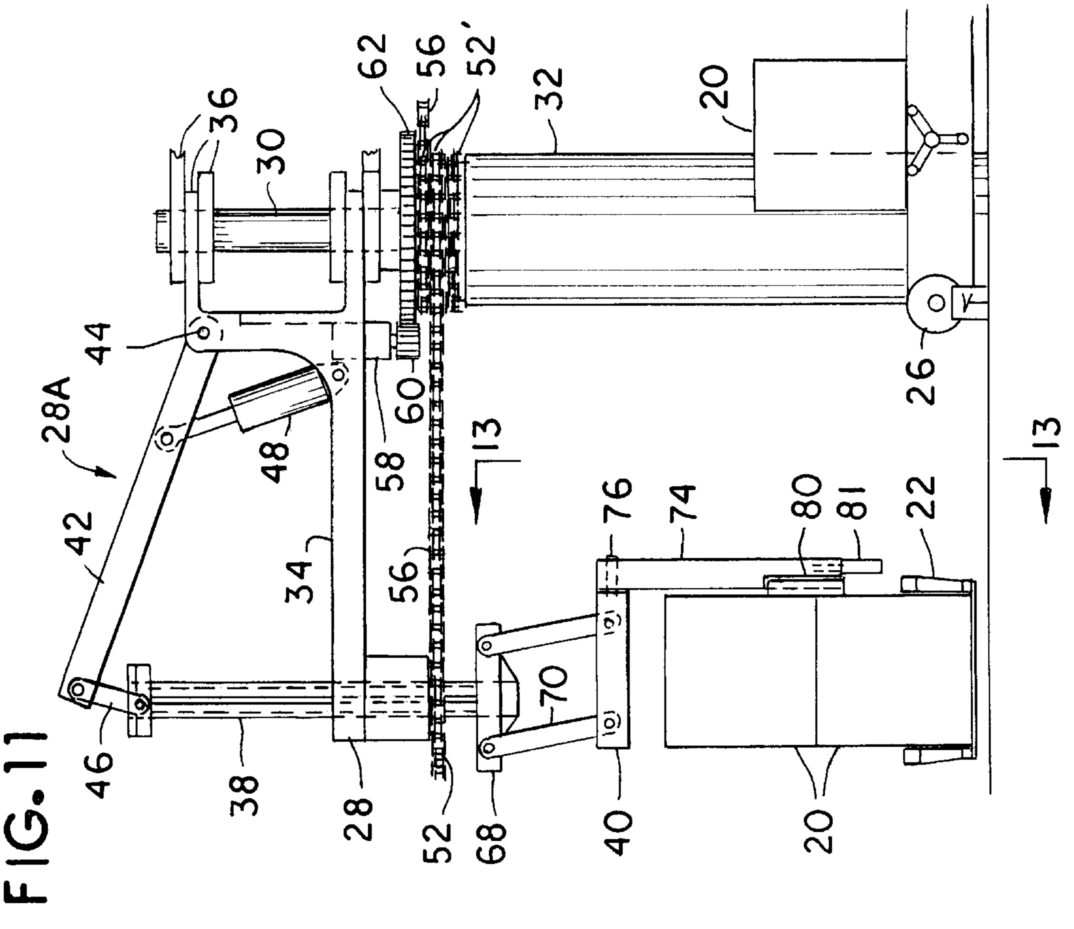

The alignment columns 74 are pivoted to swing up 45° as in FIGS. 2 and 14 to engage containers set across the conveyor and have stepped engaging ends as in FIGS. 11 and 12 with an upper forward step, roller 80, and a lower back step, roller 81, to engage roller 80 against a container and roller 81 against the side of well car 22, FIG. 12.

Referring to FIG. 18, each cylinder 78 is two cylinders in one housing with a central separating wall 82. The piston rod 84 on the left enters a piston rod sleeve 85 through a sealed hole in wall 82. The extension of each piston rod in cylinder 78 lowers the column 45°, both 90°. The alignment columns are lifted 90° up parallel to the loadspreader to clear over containers on the conveyor. The alignment columns 74 are lowered 45°, as shown in FIG. 2, by exhausting one end of cylinders 78 to engage between containers spaced on the conveyor to align the end container on the conveyor for transfer.

OPERATION

The cranes 28 translate their loadspreaders retracted from over adjacent cars on track 24 and extend links 70 to engage their alignment columns against the near side of the car when substantially aligned lengthwise to align the loadspreader transversely with the car for transfer of a cargo container when aligned lengthwise as observed by an operator controlling motor 58, cylinders 72, and cylinder 48 to stop and lower the loadspreader to set a container on or engage a container on the car for lifting off. The container is lifted up and loadspreader retracted to clear an adjacent car before the crane is rotated about 45° therefrom to carry the container over the conveyor to where it is lowered thereto. Cylinders 72 are normally exhausted slowly so the loadspreader can lightly engage against the side of a vehicle before links 70 are vertical.

Conveyor 26 preferably has two runs of planks each supported on large rollers connected between two runs of roller chain to support each end of the container. Alignment columns 74 are lifted above the bottom of the container on the loadspreader as it approaches the conveyor, FIG. 2 left side, until the container is set down. Then they are lifted to clear the containers on the conveyor when returning to waiting position for the next transfer as in FIG. 2 right side.

VARIATIONS

Figures 6, 7, 8, 9, 10:
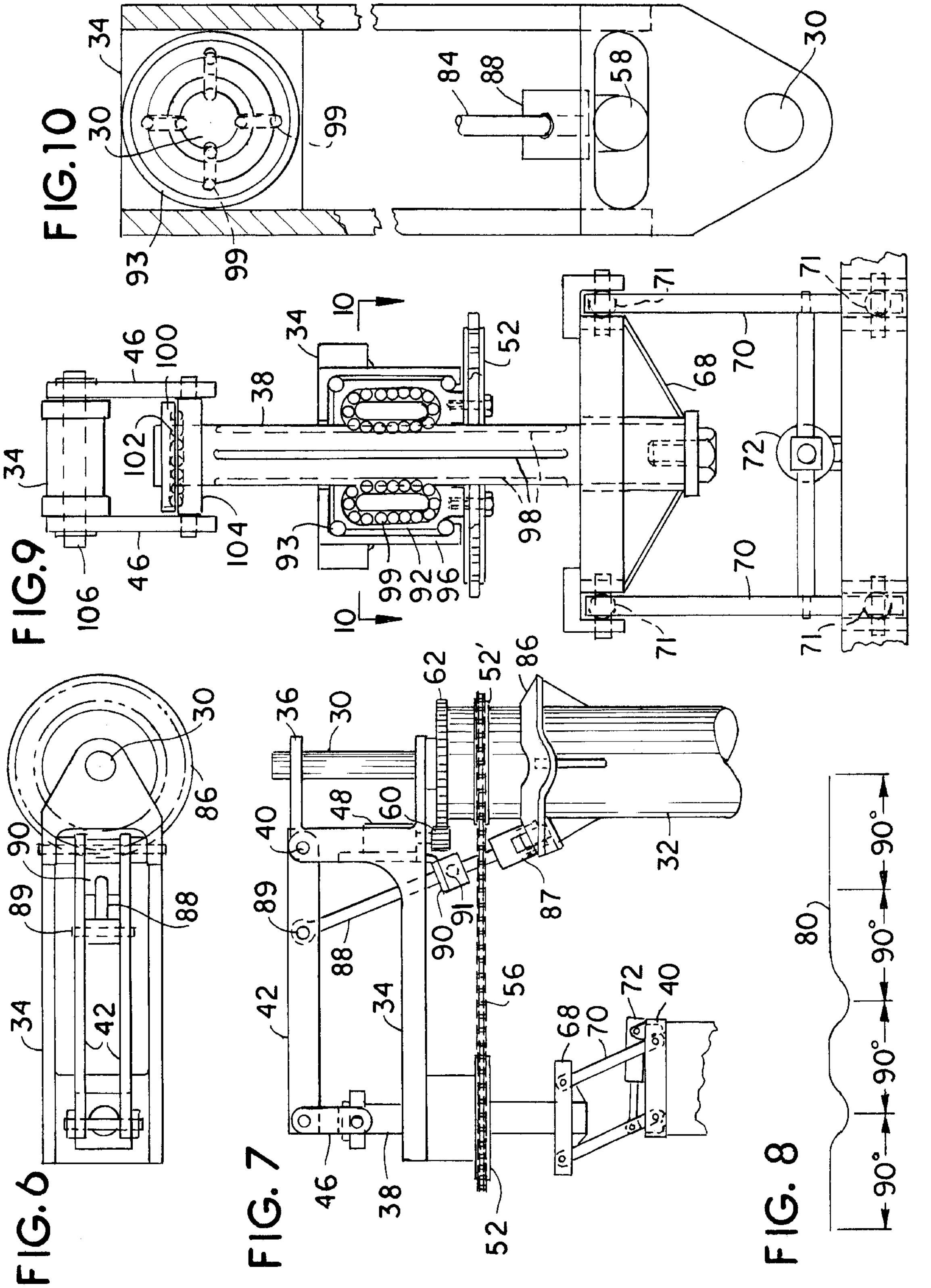
FIGS. 6 and 7 are respectively plan and side elevations of a variation of the loader having a cam track lift.
FIG. 8 is a wrap-out of the cam track.
FIG. 9 is a vertical sectional view of a lifting column on a loader with the vertical guide shown in section to larger scale.
FIG. 10 is a sectional plan view of the arm of the loader taken on line 10—10 of FIG. 9.

Referring to FIGS. 6–8, the crane lift cylinder 48 can be replaced with a cam track 86 fixed about column 32 and a lift cam wheel 87 or rod 88 pivoted on pin 89 to lift and lower the crane lift arm 42 on rises and dips around the cam track as shown schematically unwrapped in FIG. 8. A bracket 90 on arm 34 with ball sleeve 91 therein through which rod 88 runs guides the rod and holds it in place in line to arm 34. Cars 22 would have side coupling pockets for the alignment columns to enter so the car can move the crane with the loadspreader aligned through the transfer dip in cam track 86 as in my U.S. Pat. No. 5,219,261, FIGS. 10 and 11.

Referring to FIGS. 9–10 for the preferred construction of the guide arm 34 and lift shaft suspension for the loadspreader where the crane can have greater travel vertically as for double stacking containers etc. The outer end of arm 34 carries an inner ball or disc race cylinder 92 mounted on ball races 93 to revolve in an outer cylinder or sleeve 96 integral on the end of arm 34. Sprocket 52 is bolted to the bottom of the inner race cylinder 92. The lift shaft 38 has vertical keyways 98 extending between its top and bottom supports and spaced and sized for the balls or discs in races 99 in the inner cylinder to key to the lifting shaft to roll up and down in. Lift shaft 38 has a top cap 100 secured thereon resting, on a thrust bearing 102 on top of a trunion ring 104 suspended by links 46 and pin 106 through the end of the lifting arm of the crane so shaft 38 can be rotated by sprocket 52. Frame 68 is now fixed to the bottom of shaft 38 to be positioned by sprocket 52. This eliminates rod 66 which would have limited vertical movement in hole 67 in frame 68 before bumping a container when lifted. The crane is now improved to handle double stacked containers on rail cars as shown in FIGS. 11–13.

ALIGNMENT COLUMN VARIATIONS

Instead of the alignment columns having a step with rollers 80 and 81, the lower ends of the alignment columns can have engaging members 110 to contact the side of both a container and a well car to align the loadspreader transversely for transfers. There are shown herein improvements over my pending patent application for this.

Referring to FIGS. 13–16, the alignment end of the alignment columns 74, FIG. 13, have an air bag 110 which when inflated as in FIG. 15 extends out to engage the side of two containers 20 or a container and trailer bed to align them sidewise as in FIGS. 13 and 15, and which is deflated in FIGS. 14 and 16 to align the loadspreader transversely with the well car. Cables or chains 112 limit the outward extension of the inflated air bag to about one foot.

Figure 21:
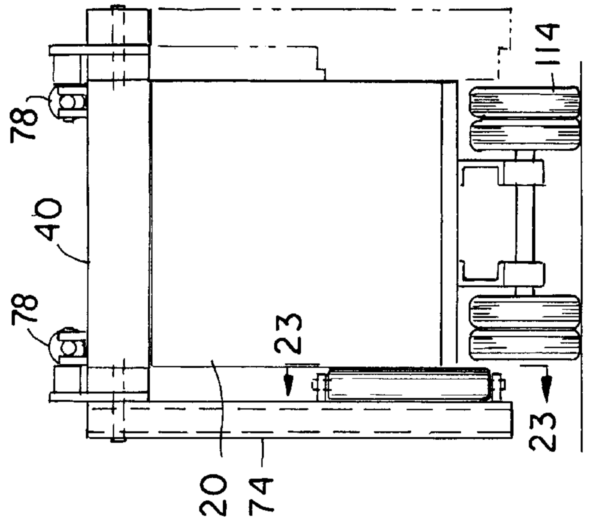
FIG. 21 is a sectional elevation on line 21—21 of FIG. 20 through the loadspreader over the container on the trailer showing an alignment arm aligning the container with the trailer to larger scale.
Figure 22:
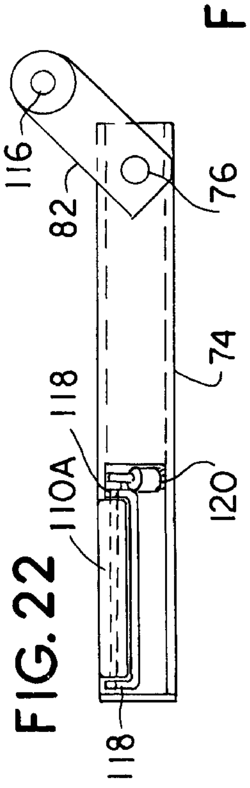
FIG. 22 is a view of the engaging side of the alignment arm of FIG. 21 to larger scale laying down.
Figure 23:
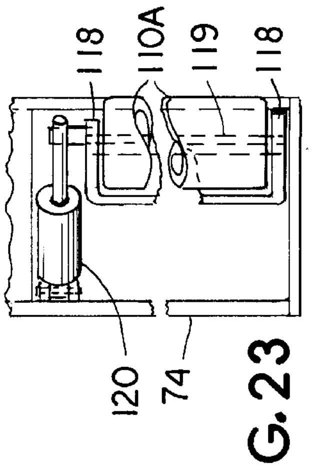
FIGS. 23 and 24 are broken views taken on lines 23—23 and 24—24 of FIGS. 21 and 20 respectively to larger scale.
Figure 24:
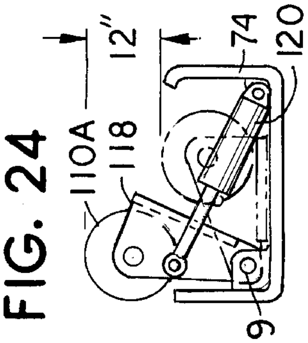

Referring to FIGS. 19–24, the alignment columns can have an engagement roller 110A, equally applicable in the preceeding Figures, that is extended outward parallelly as in FIGS. 21 and 24 for aligning container to container or to truck bed 114 or retracted for the well car. This column has a frame of rectangular tubing with wall cut away at bottom end for roller 110A (or air bag) to recess into. Roller 110A is soft rubber covered, suspended on two arms 118 connected and pivoted on pin 119. An air cylinder 120 is pivotally connected between an arm 118 and column 74 to retract the roller the travel needed for the well car, about 12 inches, and extend out for the trailer and container alignment.

OPERATING POSSIBILITIES

Figure 25:
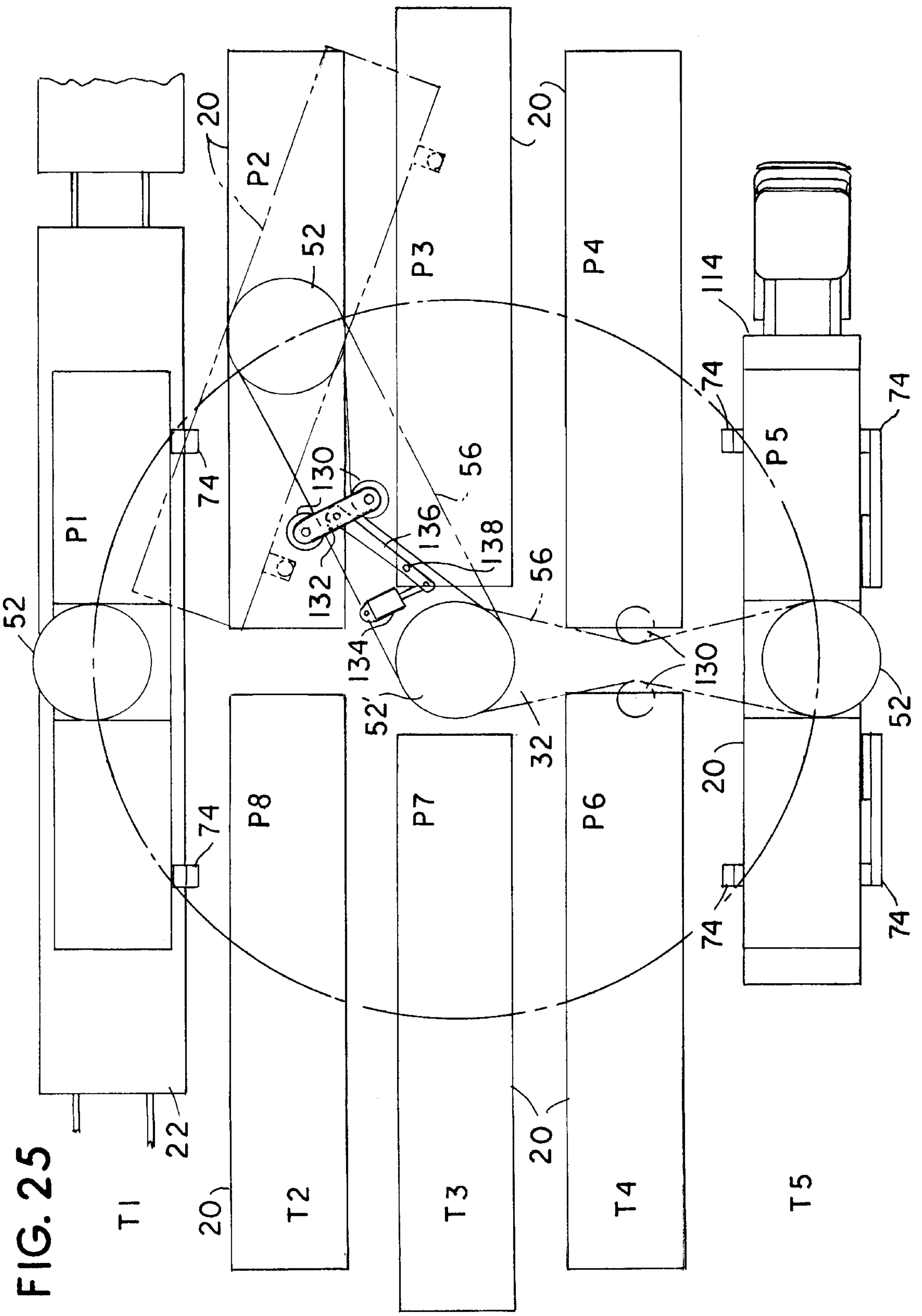
FIG. 25 is a schematic plan view of the area covered by the loader and the possible positions for transfer or storage of cargo containers thereon.

Referring to FIG. 25, there are many ways this loader can be operated. There are eight stopping or transfer positions shown numbered clockwise P1–P8. Tiers of positions are numbered T1–T5. Tiers T1 and T5 each have an extended position tolerance for aligning widthways and lengthways on a vehicle such as rail car 22 tier T1 and a semitrailer 114 in tier T5, or on tier T1 after the rail cars are moved away if the track is in a driveway. Tiers T1 and T5 could both have rail for transfer between single stack and double stack cars. Tier T3 positions P3 and P7 can be transfer positions for conveyors, as conveyor 26 could be on either side at P3 or P7 or at both locations. Tier T4 could be a driveway with transfer positions at P4 and P6. The operation of one or two loaders about column 32 could be full circle or back and forth with one loader or two loaders working opposite half circles ie. positions P1, P2, P3 and possibly P4 or P5 with one loader and positions P1, P8, P7 and possibly P6 or P5 with a second loader crane. The loaders can have alignment columns 74 down on either the far side or near side to align vehicles in positions P4 and P6. Positions P2–P8 could be for ground storage of containers.

If desired the loadspreader can be turned for bringing the forward alignment column 74 forward to line of engagement for a moving vehicle to catch in its coupling pocket before the rear column is aligned. For this two idler sprockets or rollers 130 connected by yoke 132 to engage chain 56 therebetween are shifted by air cylinder 134 and linkage 136 pivoted, at 138 to arm 34. They are shifted to the forward side as shown in FIG. 25 at position P2 to rotate the loadspreader substantially as shown in phantom until the alignment force on the forward alignment column engaged in the forward pocket on the next vehicle forces the rollers 130 central of arm 34 as the loadspreader aligns parallel the vehicle moving to the left. The car 22 can be stopped ahead of, to the right of, position P1, (about 10–20 feet) and the loader moved counterclockwise until the forward alignment column couples in the forward pocket on the car before the car and loader are moved together through the transfer run.

MORE VARIATIONS OF THE ALIGNMENT COLUMNS

If the loader does not need to interface with a conveyor the alignment columns can be as in FIGS. 26–32. This alignment column 74A has a vertical guide 144 secured to the loadspreader 40 in the same location as and in place of columns 74 two on one side of the loadspreader. An inner 146 and an outer 148 vertical rod or column are held spaced apart in each guide 144 to slide up and dun vertically. Columns 146 and 148 preferably have a rubber covered roller 80 and 81 respectively at the bottom to roll on respectively a cargo container 20 and the outer side of a well car 22. Columns 146 and 148 are connected by pin 154 through them at the top fixed in one column and loose in the other to support the columns on guide 144. Deflector wings 158 are secured to the inner column 146 with wings extended out to straddle the outer column 148, FIG. 31, to deflect the columns from the corners of containers etc.

Figures 26, 27, 28, 29, 30, 31, 32:
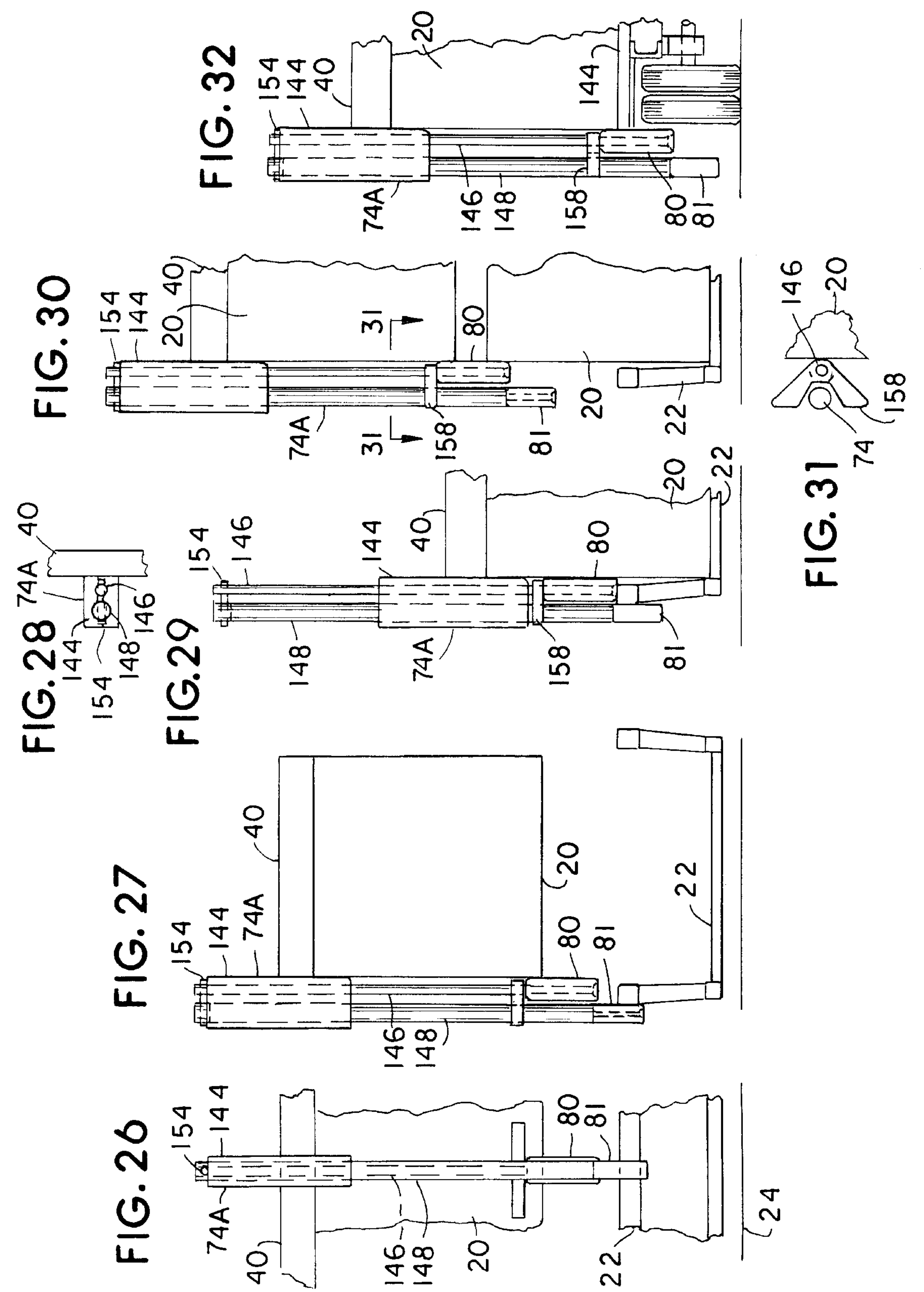
FIGS. 26 and 27 are respectively side and end elevations of another alignment column on a loadspreader holding a container at approach height over the well car.
FIGS. 28 and 29 are partial plan and end elevation of the loadspreader showing the same alignment column when the container is lowered into the well.
FIG. 30 is a partial end elevation of the loadspreader setting a second container on the well car.
FIG. 31 is a section on line 31—31 of FIG. 30.
FIG. 32 is a partial end elevation of the loadspreader engaging a container on a track trailer.
Figure 33:
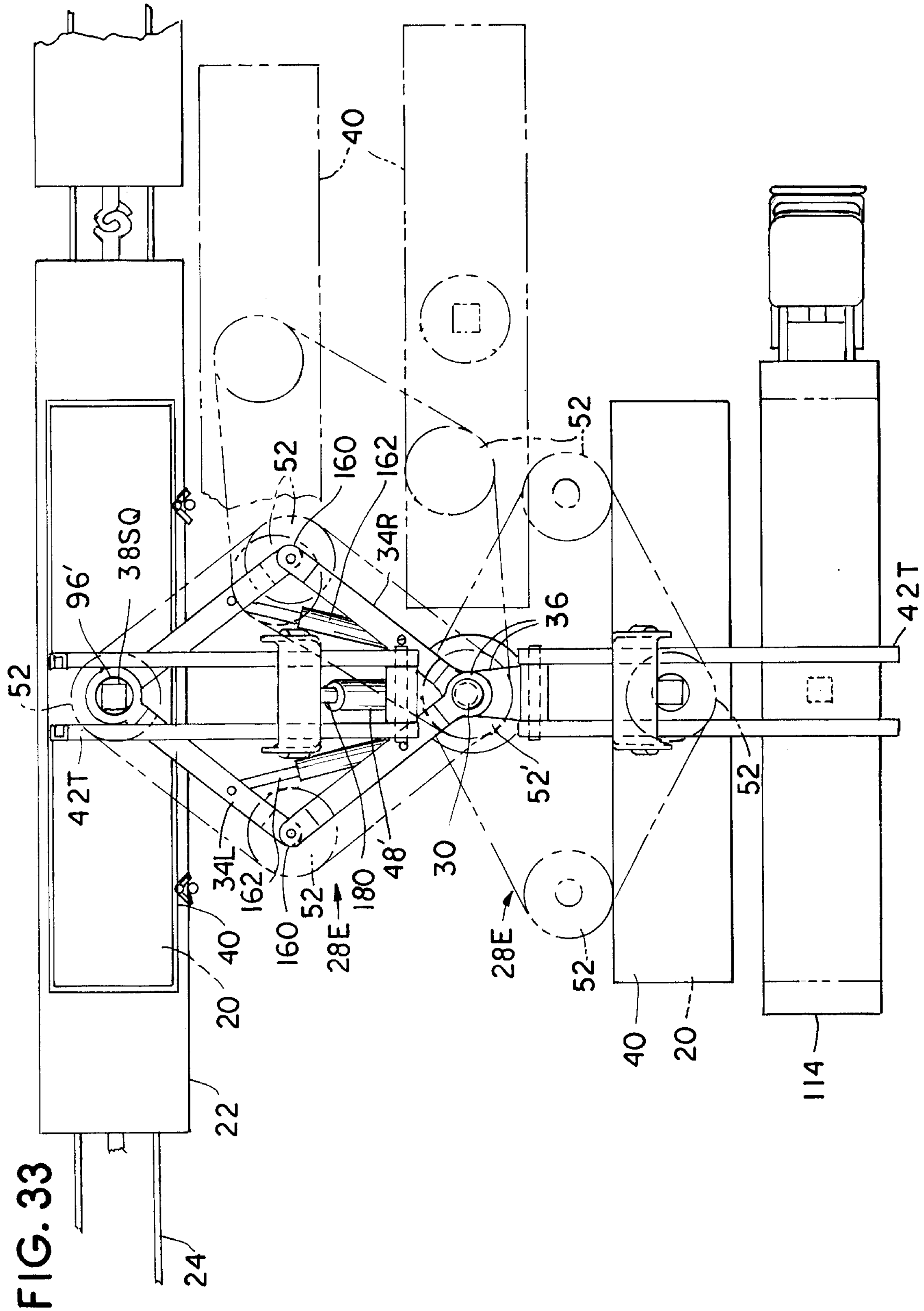
FIG. 33 is a plan view of a variation of the loader with two cranes having retractable and extendible positioning arms transferring cargo containers to or from vehicles.
Figures 34, 35, 36, 37, 38:
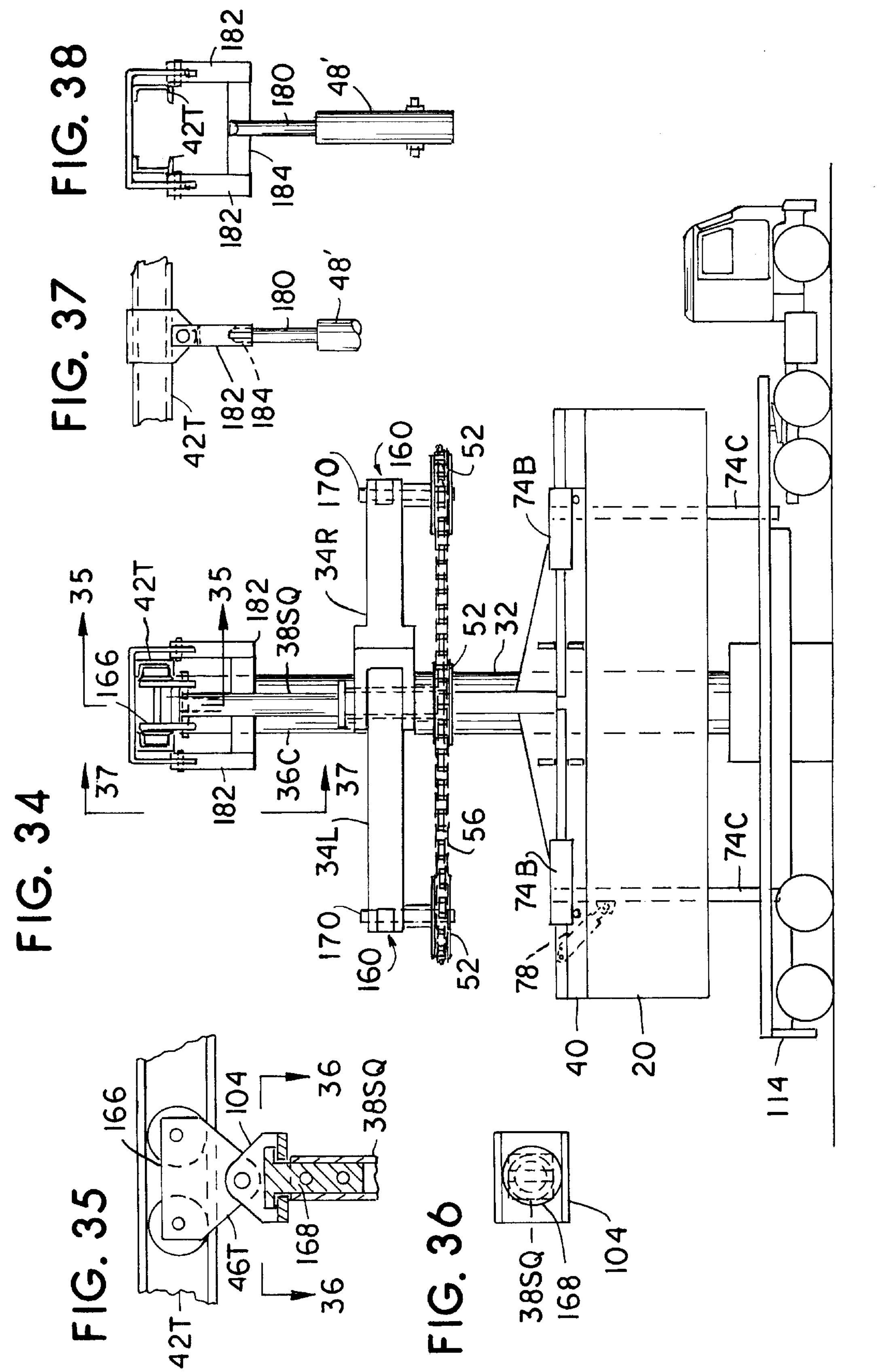
FIG. 34 is a front view of FIG. 33 showing the loader about to engage a container on a semitrailer.
FIG. 35 is a section on line 35—35 of FIG. 34.
FIG. 36 is a section on line 36—36 of FIG. 35.
FIG. 37 is a view taken between lines 37 of FIG. 34.
FIG. 38 is an end projection of FIG. 37.

FIGS. 26 and 27 show a container carried at a height to clear the inner roller 80 over the side of the well car 22 and engage the outer roller 81 against the side of this car. The loadspreader is lowered as in FIG. 29 to set the container down in the well while inner roller 80 supports the outer roller 81 as both columns 146 and 148 are extended out the top of guide 144 as it is lowered. To lift a container from the well the loadspreader is carried to position over the car as in FIG. 27 and when vertically aligned it is lowered to position as shown in FIG. 29. To set a container on top of one in the well (or on the ground) the loadspreader is moved at the height shown in FIG. 30 to position over the bottom container before being lowered to set the container on top of one. The same height relation between rollers 80 and 81, about 18 inches, enables the cargo container to be set on or lifted from a semitrailer bed as shown in FIG. 32. Neither roller 80 or 81 touches the ground in any of these operations. If a container is to be set on or lifted from the ground the loadspreader is carried at the height, FIG. 32, over the ground until aligned and lowered and lifted without horizontal movement while roller 81 engages the ground.

EXTENDIBLE LOCATING ARMS

Cranes with extendible locating arms are preferred where the links 70 and cylinders 72 are not adequate to clear the loadspreader from adjacent vehicles or to reduce the height of the crane. Similar parts are given the same number or a suffix added.

Referring to FIGS. 33–39, one or more extendible arm cranes 28E on pivot post 30 each have two equal but opposite horizontal elbow arms 34L and 34R pivotally secured to rotate slightly relatively to each other on pivot post 30 and together around the pivot post each on an integral offset bracket 36. Arms 34L and 34R are hinged together at their outer ends on a round sleeve 96' through which a square load shaft 38SQ runs. Each arm has two lengths connected by an elbow 160 and together forming a horizontal quadrilateral, kite shape, or parallelogram linkage. A hydraulic cylinder 162 connects the lengths of one or each arm to extend and retract the arms to extend and retract the loadspreader relative to the pivot post. A central bracket 36C is mounted to revolve on post 30 between arms 34L and 34R supported thereon. Lift arm 42T is pivotally mounted on pin 44 on the top of bracket 36C and is held lifted by cylinder 48' pivotally connected between lift arm 42T and bracket 36C. The lift arm is a track in which a lift trolley 166 runs out and in along the arm relative to the pivot post. The loadspreader 40 is supported by square tubular column 38SQ run through a square sleave 96SQ in round sleave 96' in the hinge (as pin) connecting arms 34L and 34R at their outer ends. A round shouldered pin 168 secured vertical in the top of square shaft tubing 38SQ turns in a round hole in trunion collar 104 connecting the side plates 46T to trolley 166 to support the loadspreader.

Four equal sprockets 52 or 52' are connected by a roller chain 56 to keep the loadspreader in one direction as the crane is rotated about pivot 30. One sprocket 52' is secured fixed on top of the pivot column 32 concentric with pivot 30. A sprocket 52 is secured below each arm 34L and 34R to turn on the pivot pin 170 of each elbow 172. The fourth sprocket 52 has a central square hole in which square sleeve 96SQ is tightly fit. Sleeve 96SQ has a top 176 supporting it to rotate on the round sleeve 96' and a bottom collar 178 supports the sprocket. The four sprockets are in a horizontal plane and connected by roller chain 56 in all positions of the arms from extended to retracted to hold the loadspreader in parallel planes as it is moved around the pivot 30 and in and out.

The rod 10 of lift cylinder 48' is forked to pivotally support monorail arm 42T on the sides so trolley 166 can run above the forked end of the cylinder's rod between side rods 182 connected to the central rod 180 by an upstanding plate member 184. Cylinder 48, is single acting to liftarm 42T, lifting trolley 166, lifting shaft 38SQ, lifting the loadspreader and its load.

Cylinder 162 connected between the inner and outer length of each arm 34L and 34R is controlled to extend and retract these arms to extend the loadspreader over a vehicle when substantially aligning a container lengthwise therewith, then extended and lowered in alignment for transfer. After lifting off a container the arms are retracted to clear any adjacent container or vehicles in the arc swept by the loadspreader.

This extendible arm design has eliminated frame 68 and links 70 and reduced the overall height of the crane accordingly.

The loadspreader has swing-up locating columns 74B for engaging a railway car or containers on one side and locating columns 74C which also are controlled by a cylinder 78 to swing down to engage a semitrailer or container on the opposite side when the columns 74B are lifted. Cylinders 78 are controlled to lift and lower locating columns 74B and 74C independently or oppositely to enable the loadspreader to engage a container or vehicle from either side.

SOME VARIATIONS

Figure 40:
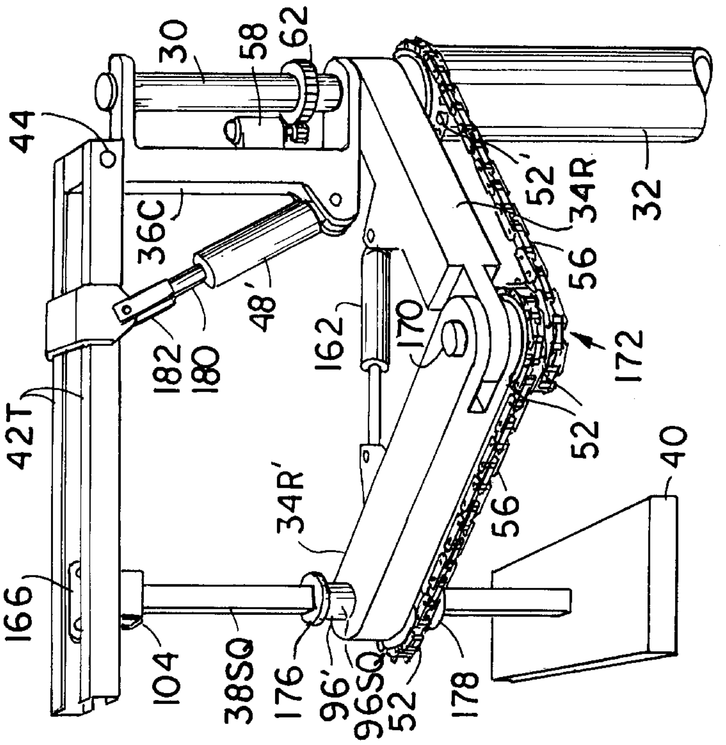
FIG. 40 is a perspective view of a loader crane with one extendible positioning arm.
Figure 39:
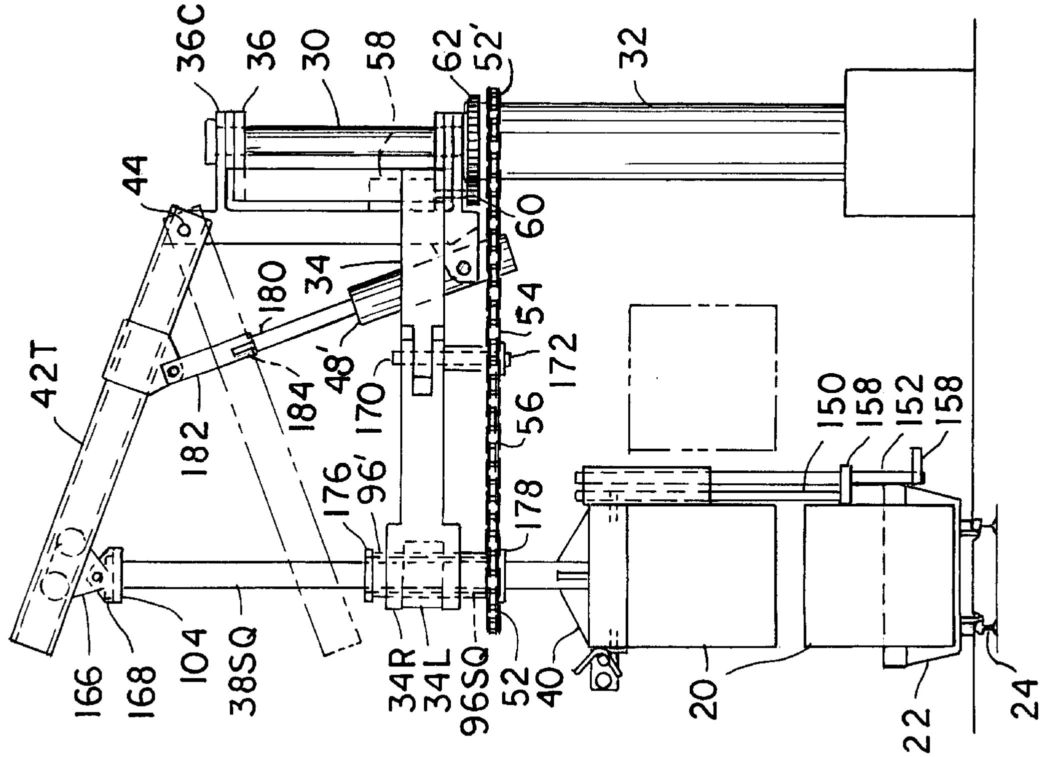
FIG. 39 is a side elevation of the loader of FIG. 33 positioning a container over a container on a well car.

Opposite hinged locating arms 34L and 34R can balance side forces on lift shaft 38SQ, but one arm will work with the sprockets arranged as in FIG. 40 where two sprockets 52 are connected together to turn as a unit on pin 170 connecting the inner and outer lengths of arm 34R'. A chain 56 is connected around sprocket 52' fixed concentric about post 30 and on column 32 and the bottom sprocket on pin 170. Another chain 56 is connected around the upper sprocket on pin 170 and the sprocket 52 on square sleeve 96SQ slip fit on square shaft 38SQ to carry the loadspreader through parallel planes as it is carried around the pivot post.

Figure 41:
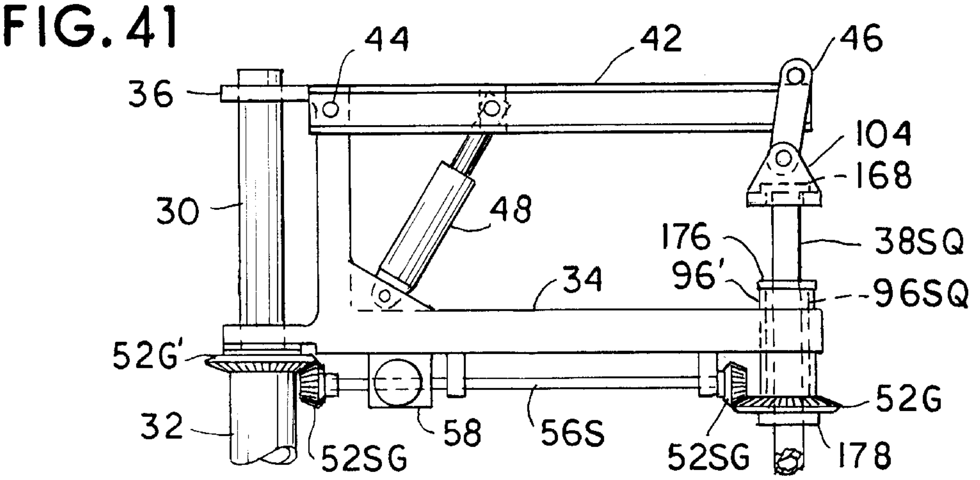
FIG. 41 is a side elevation of a variation of the crane of FIG. 1 with beveled gears and shaft replacing the sprockets and chain for alignment of the loadspreader.

Refer to FIGS. 41—41 for variations using beveled gearing and shafting to replace the roller chain and sprockets to turn the lifting shaft to keep the loadspreader parallel, applicable in either the fixed length arm or extendible arm cranes.

Figure 42:
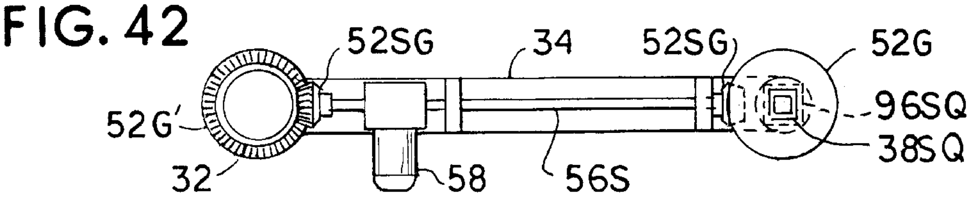
FIG. 42 is a bottom view of FIG. 41.

The fixed length arm crane in FIGS. 41 and 42 has beveled gear 52G' fixed on column 32 concentric with pivot post 30 and a beveled gear 52G with a square hole secured in place of the sprocket 52 on square sleeve 96SQ on the square lift shaft 38SQ. The two beveled gears 52G and 52G' are faced oppositely (up and down) and each engaged by a small beveled gear 52SG on connecting shafting 56S supported along the arm and driven by gearmotor 58.

Figure 43:
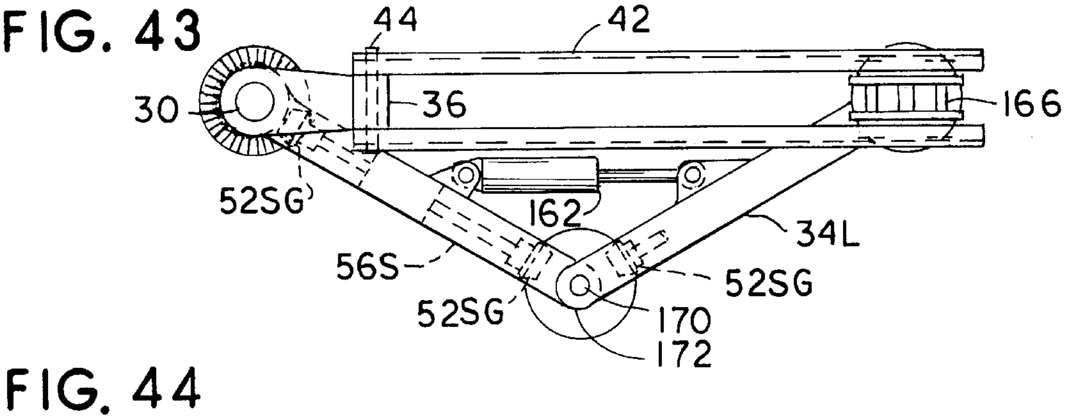
FIG. 43 is a plan view of a variation of the crane of FIG. 33 with beveled gears and shafts replacing the sprockets and chain and only one positioning arm.
Figure 44:
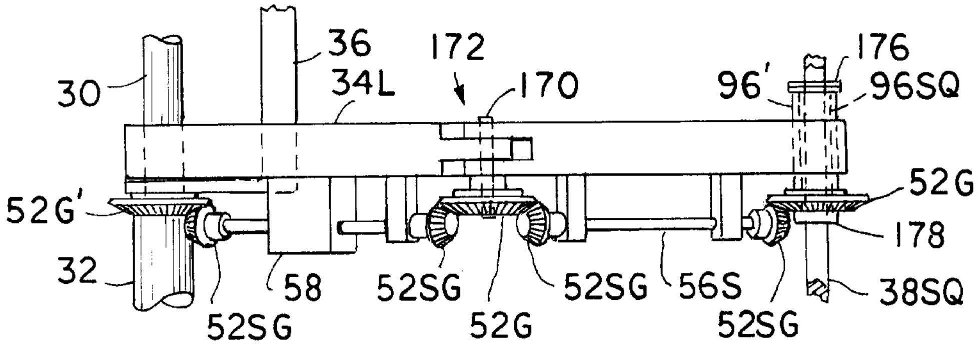
FIG. 44 is a side view of FIG. 43.

The hinged arm crane in FIGS. 43 and 44 has three large beveled gears 52G or 52G' one concentric with pivot 30 on column 32, one concentric on hinge pin 170 connecting the lengths of arm 34L, and one concentric on spline or square sleeve over and to rotate shaft 38SQ. Two small beveled gears 52SG are connected by shafting 56S supported under each length of arm 34L to engage the large beveled gears 52G on that arm length to turn the loadspreader parallelly as the crane is driven around post 30 by gearmotor 58.

Having thus described some enbodiments and applications of my invention I do not wish to be limited to those disclosed but intend to cover this invention by claims to cover all variations, applications and parts which are within the true spirit and scope of this invention.

I claim as my invention:

1. A container jib crane and system having a pivot post held vertical, at least one jib crane having a jib crane arm mounted to radially revolve around said post at a fixed height, a loadspreader and support means therefore mounted to revolve horizontally about the end of said arm and move up and down thereon, mechanical connecting means for rotating said support means on said arm in step with the rotation of said arm to keep said loadspreader parallelly positioned in one direction as the arm is revolved, means for lifting and lowering the support means to lift and lower said loadspreader to transfer loads in parallel positions, and means for supporting said loadspreader to move laterally radially to said pivot post to align a vehicle when engaged therewith over a distance of travel past the pivot post.

2. A system as in claim 1, said load engaging and support means including a loadspreader, and means for extending and retracting said, loadspreader radially relative to said pivot to align a vehicle over a distance of travel past the loader.

3. A system as in claim 1, said load engaging and support means including a central vertical shaft mounted to rotate on its vertical axis on said jib crane arm, said means for rotating said loadspreader and support means being a chain and a first sprocket fixed concentric on said pivot post and a second sprocket of equal pitch and diameter as said first sprocket in line supported to rotate on said locating arm and through which said central vertical shaft is central and free to slide up and down, and means for keying said second sprocket to turn said support means, said chain connecting said sprockets to maintain an alignment of said loadspreader and support means as it is moved up and down and about said pivot post.

4. A system as in claim 3, said means for keying being a ball spline on said&lift shaft and a ball spline collar thereover secured to rotate on said locating arm and to which said second sprocket is fixed.

5. A system as in claim 1, said means for rotating said loadspreader and support means being shafting and beveled gears connected by said shafting to rotate said loadspreader equally in the opposite direction from said arm.

6. A system as in claim 1, said means for lifting and lowering 2 including a vertical lift shaft mounted to slide up and down on the outer end of the jib crane arm, a lift arm pivotally mounted over the jib crane arm to swing up and down out over said lift shaft, mechanical means linking said lift arm and said lift shaft together to lift and lower the loadspreader therewith.

7. A system as in claim 1, said jib crane arm comprising a right and a left side arm each pivoted on said pivot post, the first pivot, and each having two lengths, two pivots being a pivot pin joining these two lengths as at an elbow on each side arm and both sides joined about said support means including a lift shaft as a fourth pivot; four equal sprockets horizontally aligned, one on each of the four pivots, a chain joining said sprockets in all positions so said arm can extend and retract said loadspreader and support means relative to said pivot post while maintaining orientation in one direction.

8. A system as in claim 1, said jib crane arm comprising two lengths, a vertical elbow pin connecting said lengths together, said means for lifting and lowering including a lift shaft, two equal sprockets and chain connecting said pivot post and said elbow pin, and two other equal sprockets and chain connecting to turn with the said sprocket on said elbow pin and said lift shaft to rotate together so said locating arm can be extended and retracted relative to said pivot post while holding said load engaging and support means in a preselected direction.

9. A system as in claim 7, except gearing and shafting replacing the sprockets and chain, a bevel gear on each said pivot and a second bevel gear meshing therewith shafting connecting adjacent second bevel gears.

10. A system as in claim 8, except gears and shafts replacing the sprockets and chains, a bevel gear on each said pivot and a second bevel gear meshing therewith shafting connecting adjacent second bevel gears.

11. In a system as in claim 1, said loadspreader having alignment columns, two spaced apart along one side for aligning a cargo container on a well car and two spaced on the opposite side for aligning a cargo container on a semitrailer, said alignment columns being operable to swing up and down on each side together.

12. In a system as in claim 1, said loadspreader having two alignment columns along one side of the loadspreader, each said column having a stepped engaging end with an upper forward step to engage a cargo container or semitrailer and a lower back step to engage a well car, and means for raising and lowering the columns relative to the loadspreader to align the loadspreader for transfer of a container on either a semitrailer or well car.

* * * * *

UNITED STATES PATENT AND TRADEMARK OFFICE
CERTIFICATE OF CORRECTION

PATENT NO. : 6,068,438
DATED : May 30, 2000
INVENTOR(S) : Leonard D. Barry

It is certified that error appears in the above-identified patent and that said Letters Patent are hereby corrected as shown below:

Column 1, line 25 - Replace "In" with --in--

Column 6, line 23 - Replace "dun" with --down--

Column 8, line 47 - Move "laterally" to line 48 after --radially to said pivot post to--

Signed and Sealed this

Fifteenth Day of May, 2001

*Attest:*

Nicholas P. Godici

NICHOLAS P. GODICI

*Attesting Officer*

*Acting Director of the United States Patent and Trademark Office*